Figure 4:
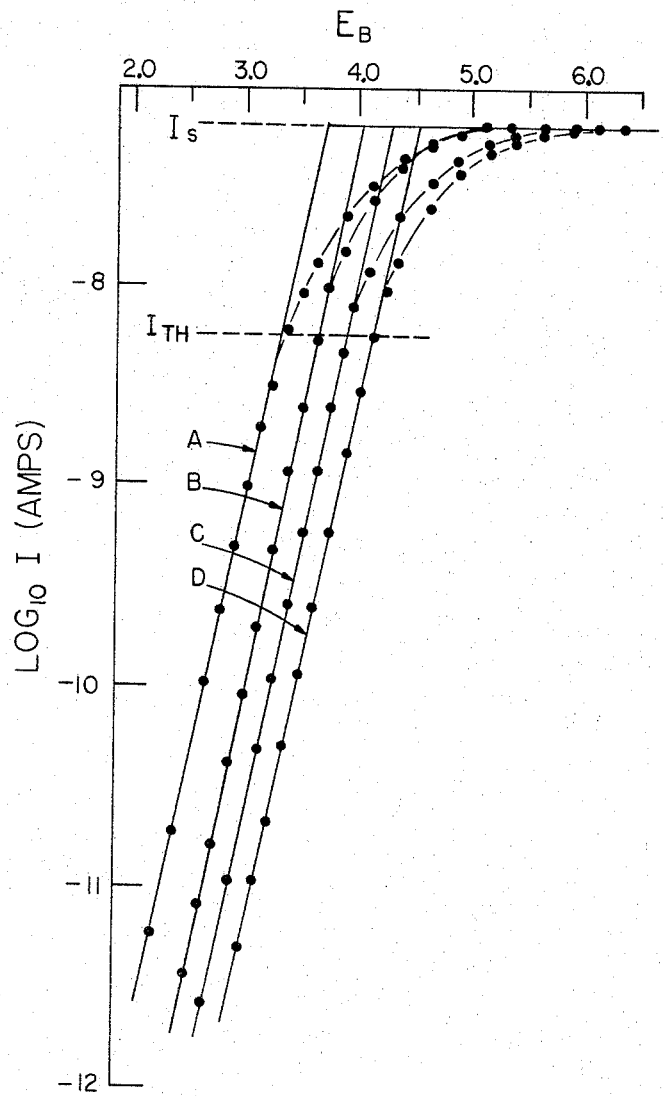

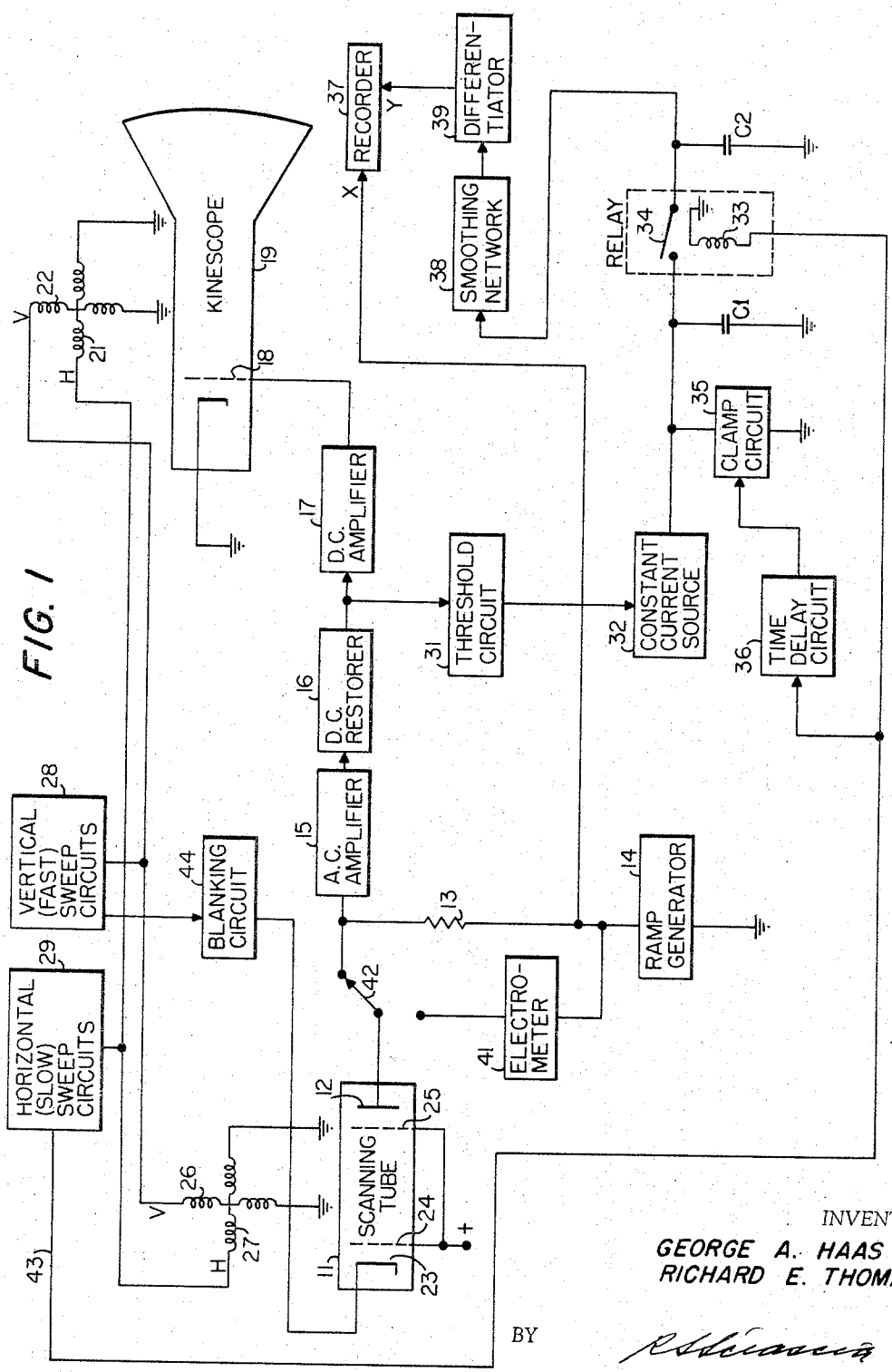

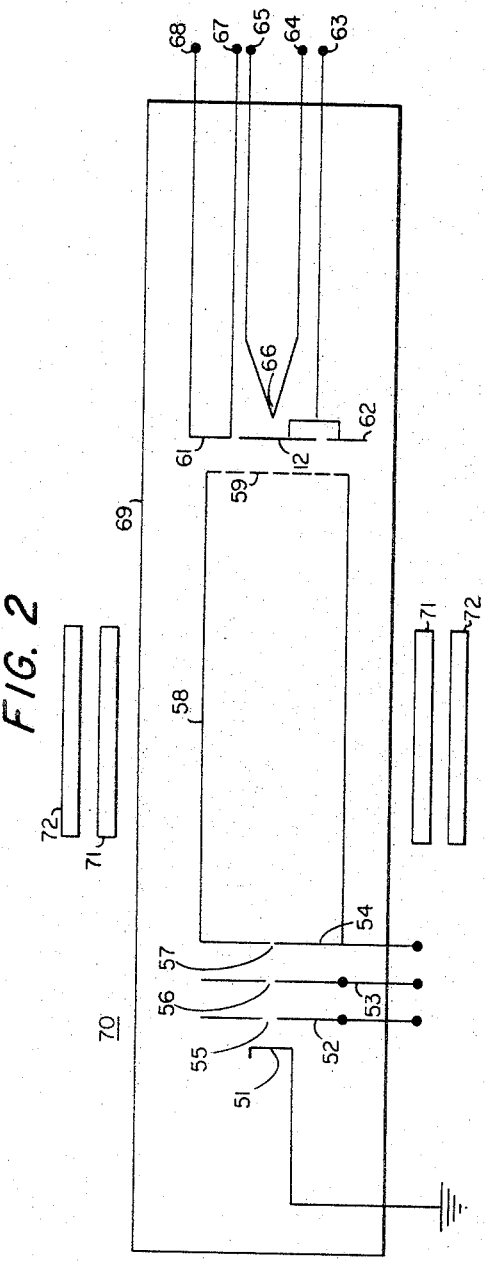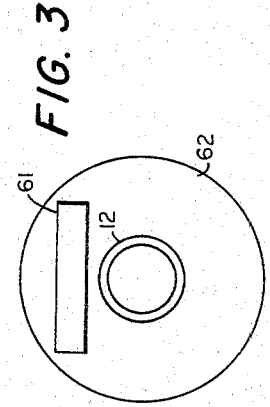

INVENTORS
GEORGE A. HAAS
RICHARD E. THOMAS 3,337,729
METHOD AND APPARATUS FOR INVESTIGATING VARIATIONS IN SURFACE WORK FUNCTION BY ELECTRON BEAM SCANNING
Richard E. Thomas, Riverdale, Md., and George A. Haas, Alexandria, Va., assignors to the United States of America as represented by the Secretary of the Navy
Filed Nov. 27, 1964, Ser. No. 414,483
13 Claims. (Cl. 250—49.5)

The invention described herein may be manufactured and used by or for the Government of the United States of America for governmental purposes without the payment of any royalties thereon or therefor.

The present invention relates generally to a method and apparatus for investigating the surface of materials and more particularly to an electron beam scanning method and apparatus for measuring the variations in work function of a surface.

Surface investigations of thermionic emitters have indicated the presence of a nonuniformity of the surface work function and a dependence of this nonuniformity on the state of activation. This implies that the surface is not composed of a single value of work function but is probably composed of many small regions having different and individual values of work functions called "patches."

Techniques involving measurement of total emission make it impossible to discern from which patch an electron originated. Since only an average value of work function is obtained, no information is provided regarding the distribution in work function of the surface, i.e., the relative abundance of regions having any given work function.

In making a detailed investigation of the variation of surface work functions, it has been the general practice to employ either the electron emission microscope, the electron mirror microscope, or a method of analyzing the anomalous retarding potential region. Among the disadvantages of using the electron emission microscope is that the electron-optically magnified image of the emitter surface which appears on a phosphor screen must be first translated to electrical current before values of work function can be determined. This requires the use of a Faraday cage with which it is difficult to view the different portions of the surface. Another disadvantage is that the surface under study must be made hot enough to emit electrons. A further disadvantage is that a patch distribution plot is not available. There are also disadvantages in employing the electron mirror microscope. Though it eliminates the requirement of having a surface which is hot enough to emit electrons, the electron mirror microscope introduces an additional difficulty since the region of best contrast for recording reflected electrons is near the saturation region where most electrons are accepted by the surface. The only electrons reflected in that region are the low energy electrons which are strongly affected by patches on the flooding emitter.

The method involving the analysis of the anomalous retarding region provides a measurement of the patch distribution by means of a detailed analysis of the retarding-to-accelerating characteristics of a diode. This technique has the disadvantage that one of the electrodes must be patch free, thus stipulating a single work function type surface and the absence of localized patch fields. A further disadvantage is that no information can be obtained as to individual patches since the total current is being measured. Also, techniques employing the electron emission microscope and the electron mirror microscope do not provide a patch distribution and methods dealing with the analysis of the retarding potential region do not provide visual information regarding the configurations of the patches.

The technique of this invention provides a method of observing physical processes that take place on conductive surfaces, such as surface adsorption of gases, diffusion of surface impurities, and also provides a method for observation of activation processes on thermionic electron emitters that activate at low temperatures.

The study of the non-uniformity of the surface work function is of great importance in determining the efficiency of thermionic energy conversion devices as well as the performance of cathodes used in various electron tubes. Since this technique does not require the investigated surface to be heated for electron emission, it is also ideally suited for the study of collector surfaces for thermionic energy converters.

The general purpose of this invention is to provide an electron beam scanning technique which gives a kinescope presentation of variations in surface work function and combines most of the advantages of the prior art techniques while eliminating many of the disadvantages. Visual displays of variations in surface work function and patch distribution curves are provided by this invention. To attain this, the present invention contemplates a novel scanning technique employing a scanning tube in which the material to be investigated is mounted as a target or anode. Incident on the target is an electron beam which can be scanned over the target. The electrons leaving the cathode of the scanning tube are accelerated, magnetically focused, deflected and then decelerated just before striking the target thereby causing the electrons in the beam to strike the target with near zero energy while still providing a strong electric field in front of the target to reduce the patch field interaction. As the beam strikes a certain spot on the target, the electrons are accepted or reflected depending on whether their energy is larger or smaller than the work function of that particular spot. A visual picture of the work function variation is obtained by applying a signal related to the output signal of the scanning tube to the grid of a display tube. To obtain the patch distribution curve, which is a plot of the area distribution in work function, i.e., the fraction of the total area having a work function between $\phi$ and $\phi+d\phi$, plotted as a function of $\phi$, the entire surface is scanned once at a given beam energy corresponding to a work function $\phi$, and the fraction of the total time for one scan that the surface accepted electrons is recorded. The surface is then similarly scanned at a slightly higher beam energy corresponding to a work function $\phi+d\phi$ and this fractional time is again recorded. The difference between these two times corresponds to the fraction of the total surface that is covered with work function in the region between $\phi$ and $\phi+d\phi$. By progressively changing the beam energy between successive sweeps and plotting the difference in fractional time per sweep during which the surface was accepting electrons as a function of beam energy a plot of the area distribution of the surface work function is obtained.

Accordingly, an object of present invention is to provide a novel method and apparatus for investigating the surface of a material.

Another object is to provide a method of investigating in detail the surface work function of a material.

A further object is to provide a method and apparatus for investigating in detail the surface work function of a material which does not require the investigated surface to be heated for electron emission.

Still another object is to provide a visual display of the variations in surface work function of a material.

Yet another object is to provide an electron beam probing method and apparatus for providing a patch distribution curve of the surface work function.

Figure 5A:
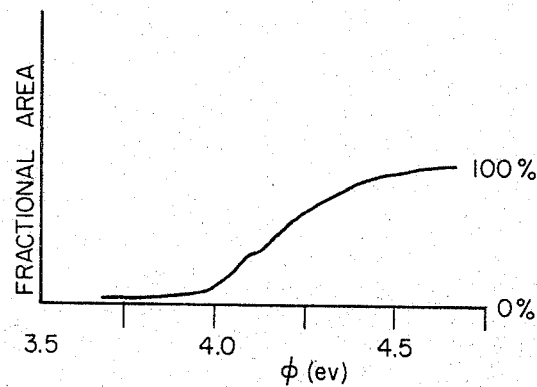
Figure 5B:
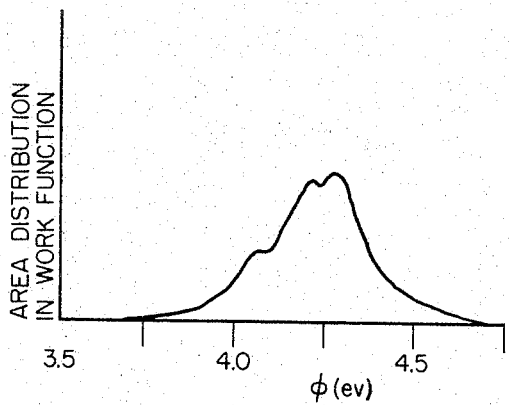

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a schematic view of the system of this invention;

FIG. 2 is a diagrammatic representation of the electron-beam scanning tube of this invention, FIG. 3 illustrates schematically a front view of the target area of the electron-beam scanning tube, FIG. 4 represents a series of retarding potential plots A, B, C and D, of four different spots of a surface under investigation, FIG. 5a is a plot of the fractional area having a work function of $\phi$ or less, and FIG. 5b is a patch distribution plot.

Referring now to the drawings, there is shown in FIG. 1 the scanning and display system including a scanning tube 11 having a specimen mounted as the target 12 or anode connected to a resistor 13 which is biased by a voltage from ramp generator 14. The signal developed across resistor 13 is applied to A.C. amplifier 15 and then to a D.C. restorer 16 which provides a D.C. reference so that all signals are positive going with respect to zero. The D.C. restorer 16 clamps the output of A.C. amplifier 15 to approximately zero so that the signals are positive going for the beginning of the next sweep. The signal is then applied through D.C. amplifier 17, which provides a preselected reference level for biasing control grid 18 of kinescope tube 19 having horizontal and vertical deflection coils 21 and 22, respectively. Scanning tube 11 is represented as having a cathode 23, which is connected to a blanking circuit 44. Blanking circuit 44 is connected to the vertical (fast) sweep circuitry 28 from which it receives a pulse at the end of each sweep and at which time blanking circuit 44 applies a positive pulse of the order of 50 volts to the cathode 23 of the scanning tube 11 in order to reduce the beam current to zero. Grid 24 and screen 25 of tube 11 are connected in common to a source of positive voltage.

Scanning tube 11 has its vertical deflection coil 26 connected to vertical sweep circuits 28 and the horizontal deflection coil 27 is connected to horizontal sweep circuits 29. Likewise, the horizontal deflection coil 21 of kinescope tube 19 is connected to horizontal sweep circuits 29 and the vertical deflection coil 22 is connected to vertical sweep circuits 28. The vertical and horizontal deflections of the kinescope tube 19 are synchronized with the vertical and horizontal deflections of the scanning tube 11 as indicated by their common connection in FIG. 1. The frequency employed for the slow horizontal sweep was approximately 1 cycle per second while the frequency of the fast vertical sweep was approximately 500 cycles per second.

A threshold circuit 31 which produces an output whenever a preset voltage is reached or exceeded is connected to the output of D.C. restorer 16. The preset voltage level of the threshold circuit 31 is related to a threshold current $I_{th}$ discussed later in relation to FIG. 4. A constant current source 32 receives the signal from threshold circuit 31 and charges capacitor C1 for the duration of the threshold signal, i.e., for as long as the threshold current $I_{th}$ is reached or exceeded as the beam of scanning tube 19 scans over the target material. At the end of the horizontal (slow) sweep, relay coil 33 is energized by a pulse through line 43 from horizontal (slow) sweep circuits 29 and relay contact 34 is closed so that capacitor C2 is charged to the voltage existing on C1 at the end of the sweep. The same signal which energizes relay coil 33 triggers clamp circuit 35 after being delayed by time delay circuit 36. Clamp 35 may be a transistor switch or any other switching device which will allow capacitor C1 to quickly discharge through it. The amount of delay provided by time delay circuit 36 should be sufficient to allow transfer of voltage from C1 to C2 at the end of the slow sweep and also sufficient to allow relay contact 34 to open so that the C2 is not discharged through clamp circuit 35. C1 is much larger than C2, e.g., of the order of 100 to 1. Since C2 is so much smaller than C1 the voltage on C2 will always represent the last voltage which was stored by C1 with negligible error. The voltage on C2 will therefore change only by an amount equal to the difference between two succeeding voltages on C1.

The voltage of C2 is applied to the y-axis input of recorder or plotter 37 after being filtered by smoothing network 38 and differentiated by differentiator 39. The signal at the output of the smoothing network 38 will be a waveform which increases smoothly with an increase in beam energy. Since this signal is differentiated by differentiator 39, and the voltage produced by ramp generator 14 is applied to the x-axis input of recorder 37, x–y recorder 37 produces a record or plot as shown in FIG. 5b called the patch distribution curve. If the smoothing network is directly connected to the recorder 37, i.e., if there is no differentiating function performed, the recorder will produce a record of the voltage to which C2 is charged at the end of each sweep as a function of beam energy. The curve thereby produced is shown in FIG. 5a and represents the fraction of area having a work function of $\phi$ or less.

FIG. 2 illustrates a scanning tube 70 which can be used as the scanning tube 11 in the system of FIG. 1. The tube includes an oxide cathode 51, a series of solid discs acting as grids 52, 53, and 54, and having apertures 55, 56, and 57, respectively, in their centers. The apertures of grids 52 and 53 are approximately $5 \times 10^{-2}$ inches in diameter while the diameter of aperture 57 of grid 54 is approximately $10^{-3}$ inches. However a smaller aperture in grid 54 will give greater resolution. A metal cylinder 58 is electrically connected at one end to grid 54. The other end of metal cylinder 58 is connected to a fine mesh (1000 interstices per inch) screen 59. In practice grid 52, is connected to a source of approximately 10 volts while grid 53 is biased by a 600 volt source and grid 54 by an 800 volt source. A ribbon 61 made of tungsten or any other suitable material serves as a work function reference and is externally connected by leads 67 and 68 to a voltage source (not shown) whenever a switch (not shown) is closed in order to heat and thereby clean the ribbon surface. The specimen target 12 to be investigated is shown electrically connected to guard ring 62 and output line 63. Leads 64 and 65 provide voltage to heater element 66 which provides a means for indirectly heating the specimen to temperatures as high as 1400° centigrade while scanning in order to observe changes in surface properties that may be temperature dependent. The target 12 is actually supported by a cup-shaped device (not shown) supported so that the target is thermally insulated from the guard ring 62 but yet is electrically connected to the guard ring. Surrounding and completely enclosing the tube elements is glass envelope 69. Focusing coil 71 and deflection yoke 72 are shown located about the tube.

A front view illustrating the relative physical location of guard ring 62, the reference ribbon 61 and target 12 is presented in FIG. 3. Guard ring 62 provides a uniform electric field around target 12.

In operation, the material to be investigated is mounted as a target or anode in the scanning tube. An electron beam of approximately 25 microns in diameter is scanned over the entire target or a small portion of it. The beam may also be held stationary to probe a particular spot on the surface. The beam electrons leave the cathode, are accelerated to approximately 800 volts, magnetically focused and deflected and then decelerated just before striking the target. This causes the electrons in the beam to strike the target with near zero energy but still provides a strong electric field in front of the target to reduce the effects of patch field interaction. The energy of the beam in relation to the target is increased linearly for each sweep by the increasing voltage of ramp generator 14 of FIG. 1. Since the scan time is much faster than the rate of ramp function increase, the beam energy for each scan is substantially constant and the results are not adversely affected by a negligible increase in beam energy during each scan. When the value of this ramp voltage is added to the work function of the cathode, $\phi_C$, the beam energy $E_B$ is given in relation to the Fermi level of the target by the equation $E_B = V_G + \phi_C$, where $V_G$ is the ramp generator voltage. As the beam strikes a certain spot on the target, the electrons are accepted or reflected depending on whether their energy is larger or smaller than the work function of that particular spot.

In order to probe a particular spot the scanning tube sweep circuits are adjusted so that the desired spot is in the center of the region being scanned. The amplitudes of the sweep voltages applied to the deflection coils of the scanning tube are then reduced to zero thereby making the beam stationary on the desired spot. Where the beam probes the retarding potential characteristics of a particular spot on the target, the amount of electrons that reach the target can be measured by an electrometer 41 which can be connected to the target by single pole double throw switch 42, as shown in FIG. 1. FIG. 4 represents retarding potential plots A, B, C and D using the electrometer techniques taken on four different spots on a surface. The spots were chosen to represent regions of low to high work-function patches on the surface. Below the threshold current $I_{th}$, which occurs about one order of magnitude below the saturated target current $I_s$, a linear retarding region is obtained in which the contact potentials between various spots remain constant. The contact potential is the difference in $E_B$ required to give the same current (below $I_{th}$) to two different spots in the linear retarding region.

The beam energy required to give ⅒ saturated target current $E_{B(Ith)}$ can therefore be employed to accurately determine the work function $\phi$ of the spot on which the beam is incident. The relation may be expressed as $\phi = E_{B(Ith)} + 1/m$ where $m$ is the slope of the $\log_{10} I$ vs. $E_B$ retarding potential plot, and the quantity $1/m$ represents the difference in beam energy in extrapolating one order of magnitude from the threshold current $I_{th}$ to the saturated target current $I_s$. The threshold current must be deep enough in the retarding-field region so that the $\log_{10} I$ vs. $E_B$ curves for all regions of the target are linear and parallel. For the surface employed in obtaining the curves of FIG. 4, $I_{th}$ is set equal to ⅒ of the saturated current. For some surfaces, one order of magnitude below the saturated current is insufficient to obtain linear retarding region, and the threshold current must be set to a lower value, such as 1.5 orders of magnitude below the saturated current level. The value of $\phi$ then becomes $E_{B(Ith)} + 1.5/m$.

The method of obtaining all of the information in the linear portion of the retarding region allows one to effectively probe the surface with electrons having a Maxwellian distribution in energy, since the low-energy electrons which are affected by patches are all reflected at these beam energies.

In operating the system of FIG. 1, the bias supplied the the grid of kinescope tube 19 is adjusted so that the transverse from the black level to the white level occurs within a space of approximately ¼V in the region of the threshold current $I_{th}$. Since the sweep circuits of the kinescope are synchronized with those of the scanning tube, a picture is obtained presenting as bright areas all regions of the scanned portion of the target having work functions of $\phi$ or less, where $\phi$ is related to present beam energy.

In addition to providing a kinescope presentation of the variation in surface work function a plot of the distribution of area according to work function is sometimes desired. The distribution curve is an important parameter in determining emission properties.

In ascertaining the area distribution information automatically by means of the system of FIG. 1, the fractional area is first obtained by making a single scan of the target at a given beam energy (which is related to the voltage of ramp generator 14 as explained above) and measuring the fraction of time that the threshold current $I_{th}$ is reached or exceeded. To accomplish this capacitor C1 is charged by constant current source 32 during the time threshold current $I_{th}$ is reached or exceeded as the beam scans over the surface of the material being investigated.

The voltage to which the capacitor is charged is proportional to the amount of time the current accepted by the surface is equal to or greater than the threshold current. The fraction of time that the threshold current is reached or exceeded in turn represents the fraction of area having a particular work function of $\phi$ or less. The voltage to which C2 is charged at the end of each sweep is applied to the $y$-axis input of recorder 37 by means of smoothing network 38 and differentiator 39. The value of voltage produced by ramp generator 14 is applied to the $x$-axis input of recorder 37 and a plot of the fraction of total area having work function between $\phi$ and $\phi + d\alpha$, plotted as a function of $\phi$, is recorded as a patch distribution curve such as is shown in FIG. 5b. If the differentiating function performed by differentiator 39 is eliminated, the curve produced by recorder 37 will be a plot of percent of total surface versus work function as shown in FIG. 5a.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A method of investigating the variation in surface work function of a material comprising the steps of
    (a) scanning the surface of the material to be investigated with a beam of electrons at a given rate and at an energy in the retarding field region of said surface wherein at least a substantial portion of the beam electrons are reflected by said surface without producing secondary emission electrons,
    (b) producing a signal representative of the amount of electrons accepted by the surface of the material at a given beam energy,
    (c) applying the signal to the input of a display tube while synchronously scanning the display tube at the scanning rate of the scanning tube, and
    (d) producing a visual presentation wherein bright and dark areas of the presentation represent variations of work functions of the scanned surface.

2. A method of investigating the variation in surface work function of a material comprising the steps of
    (a) scanning the surface of the material to be investigated with a beam of electrons at a given rate and energy,
    (b) producing a first signal for each scan representative of the amount of electrons accepted by the surface of the material,
    (c) producing signals which are representative of the amount of time a predetermined threshold is exceeded by said first signal for each scan, and
    (d) recording the signals representative of the amount of time said predetermined threshold is exceeded for each scan as a function of beam energy.

3. A method of investigating the variation in surface work function of a material comprising the steps of:
    (a) scanning the surface of the material to be investigated with a beam of electrons at a given rate and energy, (b) producing a first signal for each scan representative of the amount of electrons accepted by the surface of the material, (c) producing signals which are representative of the amount of time a predetermined threshold is exceeded by said first signal for each scan, (d) differentiating said signals, and (e) recording said differentiated signals as a function of beam energy.

4. A method of investigating the variation in surface work function of a material as recited in claim 3 wherein the electrons strike the material with an energy in the retarding field region of said surface wherein at least a substantial portion of the beam electrons are reflected by said surface without producing secondary emission electrons.

5. A system for investigating the surface of a material by providing a visual presentation of variations in the surface work function of the material comprising:

(a) means for scanning the surface of said material with a beam of electrons at an energy in the retarding field region of said surface wherein at least a substantial portion of the beam electrons are reflected by said surface without producing secondary emission electrons, (b) circuit means coupled to said material for producing a signal which is directly related to the amount of electrons accepted by the surface of the material, (c) a display tube including a control grid, (d) means coupled between said circuit means and the control grid of said display tube for applying said signal to said control grid, and (e) means for synchronizing said display tube and said scanning tube whereby the visual presentation on said display tube has bright and dark area representing the variations in surface work function.

6. A system for investigating the surface of a material by providing a visual presentation of variations in the surface work function of the material comprising:

(a) a scanning tube including an anode comprising the material to be investigated and further including means for scanning with a beam of electrons said material within said scanning tube, (b) biasing means for providing a bias voltage related to the desired beam energy, (c) first means coupled to said biasing means and said anode for developing a first signal proportional to the amount of electrons accepted by said surface, (d) second means coupled to said first means for receiving said first signal and for producing a second signal related to said first signal, (e) a display tube including a control grid, (f) third means coupled between said second means and said control grid for applying said second signal to said control grid of said display tube, (g) fourth means for synchronizing said display tube and said scanning tube, (h) whereby variations in work function of the material are visually presented.

7. The system of claim 6 wherein said biasing means is a means for producing a continually increasing linear bias voltage.

8. The system of claim 7 further including:

(a) fifth means coupled to said second means for producing a third signal which is proportional to the amount of time said first signal is equal to or exceeds a predetermined threshold level for each scan, (b) plotting means having an x-axis input and a y-axis input, (c) sixth means coupled between said fifth means and said plotting means for applying said third signal to the y-axis input of said plotting means, and (d) seventh means coupled between said biasing means and said x-axis input for applying said continually increasing bias voltage provided by said biasing means to the x-axis input of said plotting means.

9. The system of claim 8 wherein said sixth means includes differentiating means.

10. A system for investigating the surface characteristics of a material comprising:

(a) a scanning tube including an anode comprising the material to be investigated and further including means for scanning with a beam of electrons said material within the scanning tube, (b) biasing means for providing a bias voltage related to the desired beam energy, (c) first means coupled to said biasing means and said anode for developing a first signal proportional to the amount of electrons accepted by said surface, (d) second means coupled to said first means for producing a second signal which is proportional to the amount of time said first signal is equal to or exceeds a predetermined threshold level for each scan, (e) plotting means having an x-axis input and a y-axis input, (f) third means coupled between said second means and said plotting means for applying said second signal to the y-axis input of said plotting means, and (g) fourth means coupled between said biasing means and said x-axis input for applying said continually increasing bias voltage provided by said biasing means to the x-axis input of said plotting means.

11. The system of claim 10 wherein said third means includes differentiating means.

12. A method of investigating the surface of a material comprising the steps of:

scanning at a given rate and for plurality of times a given area of the surface of the material being investigated with a beam of electrons whose energies are substantially constant during each scan but vary from scan to scan;

producing constant amplitude signals during said scans whenever the amount of electrons being accepted by the surface exceeds a given threshold value; and integrating said constant amplitude signals during each scan to produce a plurality of signals, one for each said plurality of scans, which are representative of the amount of time given threshold value is exceeded for each scan.

13. A system for investigating the surface of a material comprising:

means for scanning the surface of said material with a beam of electrons at a given rate and energy;

circuit means coupled to said material for producing a first signal which is directly related to the amount of electrons from the beam accepted by the surface of the material;

threshold means coupled to said circuit means to produce a constant amplitude signal whenever said first signal exceeds a given threshold value;

integrating means coupled to said threshold means to integrate said constant amplitude signal to produce a signal which is representative of the amount of time said given threshold value is exceeded by said first signal.

References Cited

UNITED STATES PATENTS

| | | | |
|---|---|---|---|
| 3,103,584 | 9/1963 | Shapiro et al. | 250—49.5 |
| 3,235,727 | 2/1966 | Shapiro | 250—49.5 |

RALPH G. NILSON, *Primary Examiner.*

A. L. BIRCH, *Assistant Examiner.*